(No Model.)

W. H. ALBEE & W. H. PETTYS.
HOSE COUPLING.

No. 362,697. Patented May 10, 1887.

WITNESSES:
C. Neverix
E. M. Clark

INVENTOR:
W. H. Albee
W. H. Pettys
BY
ATTORNEYS.

UNITED STATES PATENT OFFICE.

WILLIAM H. ALBEE AND WILLIAM H. PETTYS, OF NEW YORK, N. Y.

HOSE-COUPLING.

SPECIFICATION forming part of Letters Patent No. 362,697, dated May 10, 1887.

Application filed October 2, 1886. Serial No. 215,148. (No model.)

*To all whom it may concern:*

Be it known that we, WILLIAM H. ALBEE and WILLIAM H. PETTYS, of the city, county, and State of New York, have invented a new and Improved Hose-Coupling, of which the following is a full, clear, and exact description.

Our invention relates to the construction of a hose coupling by which the hose may be easily and securely attached to the metal coupling-section, the object being to provide means whereby increased pressure within the hose will correspondingly increase the tightness of the coupling-joint.

The invention consists in providing the tubular projection on the coupling-section with a series of longitudinal wedge-shaped countersinks or depressions, so that when the end of the hose is received on said tubular projection and clamped thereon, as hereinafter described, the rubber of the hose will be crowded into said depressions, and an increased strain on the joint will compress the rubber between the converging sides of the depressions, and thus tighten the joint.

The invention also consists in a compressible sleeve and tapered collars for clamping the hose on the countersunk tube on the coupling-section, as hereinafter set forth.

Reference is to be had to the accompanying drawings, forming a part of this specification, in which similar letters of reference indicate corresponding parts in all the figures.

Figure 1:
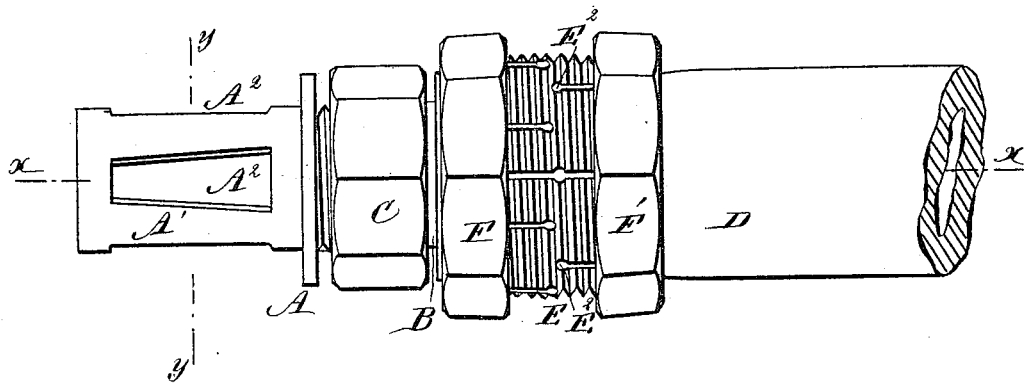
Figure 2:
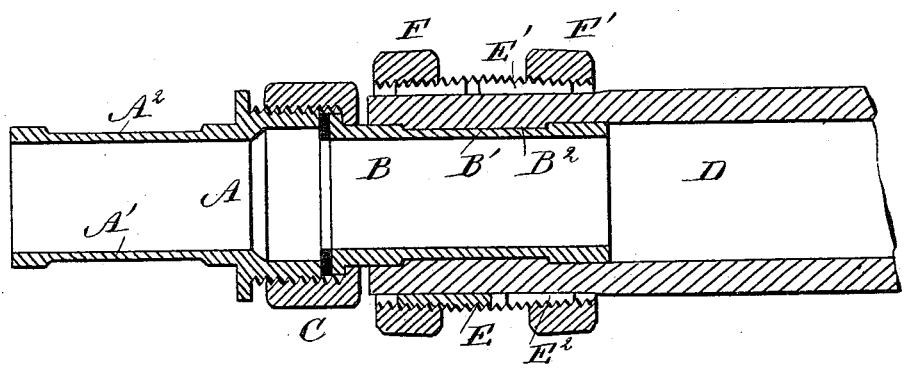
Figure 3:
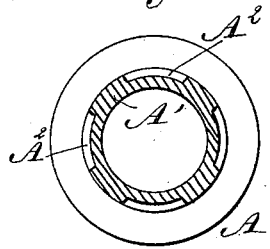
Figure 4:
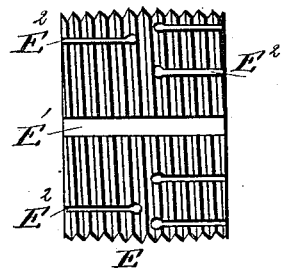

Figure 1 is a side elevation of my improved coupling, the hose being shown clamped on one coupling section. Fig. 2 is a longitudinal sectional view on the line $x\,x$, Fig. 1. Fig. 3 is a cross-sectional view of the countersunk tube on the line $y\,y$, Fig. 1. Fig. 4 is a detail view of the compressible sleeve.

A and B represent the coupling-sections, the abutting ends of which are coupled together by the flanged nut C in the usual manner, and which are formed with the tubular extensions A' B', adapted to receive the ends of the hose sections to be coupled, as heretofore.

The tubular extension A' B' of each coupling-section is formed with a number of longitudinal dovetail countersinks or depressions, $A^2\,B^2$, which are preferably arranged equal distances apart, and thus leave correspondingly wedge-shaped elevations or projections between them.

The end of the hose-section D is received on either tube, as B', and is embraced by an exteriorly-threaded sleeve, E. This sleeve is rendered radially compressible by being split transversely at E', and formed with a number of key-hole-shaped longitudinal cuts, $E^2$, extending from either end for nearly half the length of the sleeve.

For clamping the sleeve E upon the hose end, I employ two tapered collar-nuts, F F', screwing upon opposite ends of the sleeve in opposite directions, so that by working said nuts toward each other alternately or simultaneously the sleeve is contracted to any desired degree, and the hose tightly clamped upon the tubular extension B'. The rubber or other material of which the inner part of the hose is composed is thus crowded to one side by the elevations between the countersinks $B^2$ and forced into said countersinks, completely filling them. Then, when a strain is put upon the coupling-joint from increased internal pressure or otherwise, the tendency to pull the hose off the tube B' causes the rubber to be compressed between the converging sides of the wedge-shaped depressions $B^2$, and thus operates to greatly tighten the joint, while preventing it from separation. By relaxing the collar-nuts F F' the sleeve E is loosened, and the hose can then be quickly withdrawn from the coupling-section.

Having thus described our invention, what we claim as new, and desire to secure by Letters Patent, is—

The combination, with the tube B', formed with a series of longitudinal wedge-shaped countersinks, $A^2$, the inclined sides of which converge toward the outer end of the tube, of the hose D, surrounding and in contact with said countersunk tube, a compressible sleeve embracing the hose, and means for contracting said sleeve on the hose, substantially as herein shown and described.

WILLIAM H. ALBEE.
WILLIAM H. PETTYS.

Witnesses:
J. F. ACKER, Jr.,
EDWD. M. CLARK.